United States Patent [19]
Golley

[11] Patent Number: 5,846,314
[45] Date of Patent: Dec. 8, 1998

[54] PROCESS FOR TREATING A WASTE MATERIAL RESULTING FROM AN OIL RECOVERY FROM TAR SANDS PROCESS

[75] Inventor: Christopher Robin Langdon Golley, Cornwall, United Kingdom

[73] Assignee: ECC International Ltd., United Kingdom

[21] Appl. No.: 744,720

[22] Filed: Oct. 29, 1996

[30] Foreign Application Priority Data

Aug. 14, 1996 [GB] United Kingdom .................... 9617094

[51] Int. Cl.$^6$ .............................. C04B 18/00; C10G 1/04
[52] U.S. Cl. .................... 106/705; 106/706; 106/DIG. 1; 210/773; 210/787; 210/800; 210/804; 210/805; 210/806; 208/390; 208/424
[58] Field of Search .................................... 208/390, 391, 208/424, 425, 435; 209/5; 210/800, 803, 787, 788, 789, 768, 805, 773, 804, 806; 106/705, 706, DIG. 1

[56] References Cited

U.S. PATENT DOCUMENTS

| | | |
|---|---|---|
| 3,864,251 | 2/1975 | Cymbalisty ............................... 210/44 |
| 3,869,384 | 3/1975 | Schutte ...................................... 210/44 |
| 4,018,664 | 4/1977 | Bain et al. . | |
| 4,289,540 | 9/1981 | Yong et al. . | |
| 4,330,409 | 5/1982 | Yong et al. . | |
| 4,401,552 | 8/1983 | Elanchenny et al. . | |
| 4,456,533 | 6/1984 | Seitzer . | |
| 4,501,648 | 2/1985 | Ritter . | |
| 5,236,577 | 8/1993 | Tipman et al. . | |
| 5,316,664 | 5/1994 | Gregoli et al. . | |
| 5,340,467 | 8/1994 | Gregoli et al. . | |
| 5,645,714 | 7/1997 | Strand et al. . | |

*Primary Examiner*—Robert Popovics
*Attorney, Agent, or Firm*—Suzanne Kikel

[57] ABSTRACT

A method of treating a dilute aqueous suspension of solid particulate material comprising waste material from a process for recovering petroleum from oil sand includes diluting the suspension with at least 75% of its own volume of water thereby to increase the settling rate of the particulate material and allowing the particulate material to settle to form a concentrated solid sediment. The treated suspension may have been obtained from a process in which an alkaline solution is used to treat the oil sand. The water from which the concentrated solid sediment is separated may be returned to the process for recovering petroleum from oil sand. The solid sediment may be transferred to a separation vessel in which it is fractionated into a coarse particle fraction and a fine particle fraction. The fine particle fraction may comprise essentially particles having an equivalent spherical diameter not greater than 3 μm. The concentrated solid material recovered may be calcined to form a pozzolanic material.

15 Claims, 2 Drawing Sheets

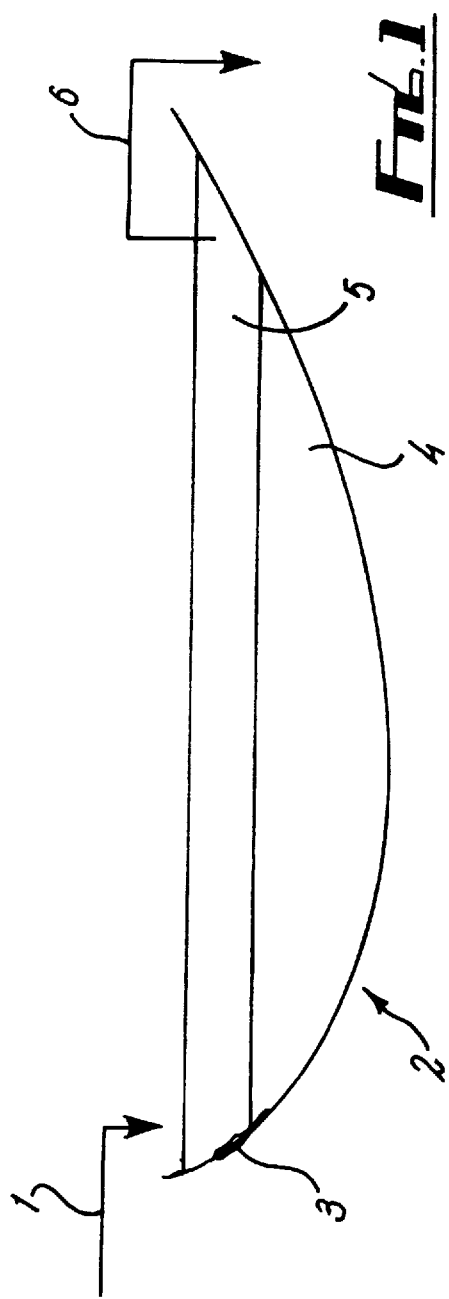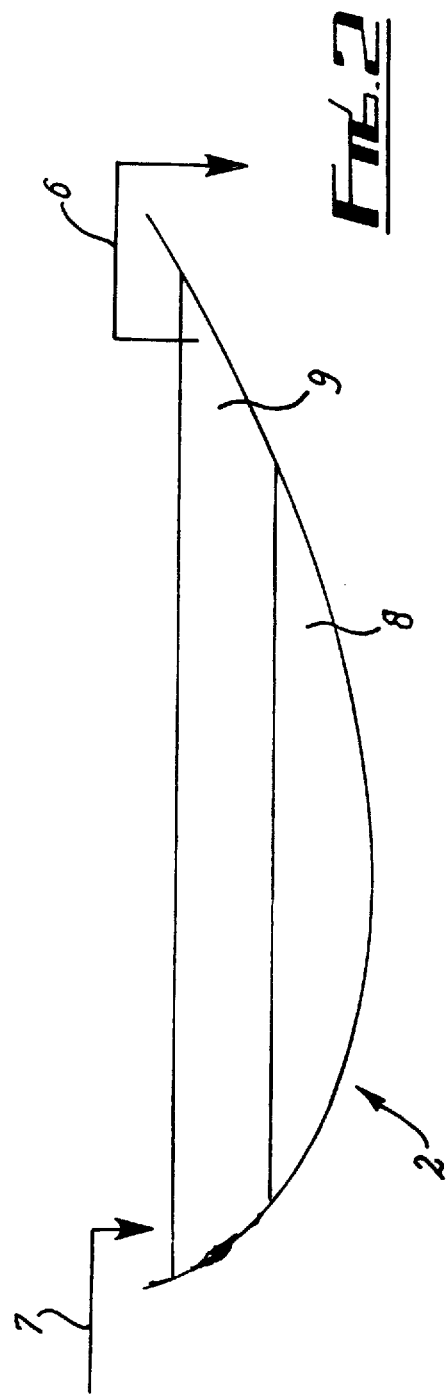

5,846,314

PROCESS FOR TREATING A WASTE MATERIAL RESULTING FROM AN OIL RECOVERY FROM TAR SANDS PROCESS

BACKGROUND OF THE INVENTION

1. Field of the Invention

This invention is concerned with a process for treating a waste material, and, in particular, with a process for treating the waste material which is left after oil-bearing sand has been treated to recover petroleum therefrom.

2. Background Art

In some parts of the world petroleum is recovered from beds of oil sand, which consist predominantly of a mixture of particles of silica sand and crude petroleum oil together with clays and minor amounts of other minerals. A particularly important deposit of such oil sand exists in the form of a shallow layer on the banks of the Athabasca River, in the Province of Alberta, 200 miles north of Edmonton. Petroleum may be recovered from such deposits by a variety of methods, but one which has been found to be economically advantageous comprises the step of digesting and conditioning the oil sand in large tumblers with the addition of hot water, steam and about 0.1% by weight, based on the weight of dry oil sand, of sodium hydroxide. In the resulting slurry, bitumen separates from the sand and is aerated, forming a froth which is readily removed in the next process step. Rocks and balled-up clay materials are removed from the slurry leaving the tumblers by means of vibrating screens, and the slurry is then diluted with additional quantities of hot water. Bitumen is separated from the diluted slurry as a froth which floats to the surface in large vessels known as primary separation vessels. The coarse sand settles to the bottom of these vessels and is removed. A portion of the slurry, known as the "middlings", is removed from the central region of the primary separation vessels, and is further processed by froth flotation to recover therefrom fine oil droplets which remain unfloated in the primary separation vessels. The froth product from the flotation step is added to the froth product of the primary separation vessels. The tailings from the primary separation vessels may also be further processed to recover oil therefrom, and the product of this process step is also added to the product of the separation vessels.

The tailings from the primary and subsequent separation stages consist predominantly of a warm aqueous suspension of sand, silt, clay, a small quantity of residual bitumen and naphtha at a pH between 8 and 9. Current commercial practice is to pump this suspension to large tailings ponds where the coarse sand particles settle out almost instantaneously to form dykes and beaches, while most of the fine particles and residual bitumen are carried into the pond as a dilute suspension, which generally has a solids content in the region of 8% by weight. Under the relatively still conditions which prevail in the body of the pond, the fine solids begin to sediment, and a layer of clear water appears at the surface of the pond. The water in this layer is recovered and recycled for use in the early stages of the separation process. The fine solids in the suspension settle to the bottom of the pond, but it has been discovered that, however long the settling process is allowed to continue, the solids content of this layer never increases above about 30% by weight of dry solids. As a result, it is uneconomic to treat this settled material to recover therefrom the residual bitumen, or any other useful product, or to convert the material into a more suitable form for disposal, because of the very large volumes of suspension which would need to be handled, and because of the high capital cost which would be entailed in providing vessels of sufficient capacity to handle these volumes. A further problem is that, even if it were economic to do so, a waste disposal process which involved the step of converting the settled material to a substantially dry state would be highly undesirable as the material contains a high proportion of fine silica particles of respirable size, which are extremely dangerous to health.

At present, the settled material is allowed to accumulate steadily, and larger and larger tailings ponds are required. However, provincial and federal governments are now giving notice that, for environmental reasons, this practice will not be allowed to continue, and alternative ways must be found to dispose of the waste materials.

Various methods have been tried to concentrate the settled material in an aqueous suspension of a waste material obtained from a process for recovering petroleum from oil sand, but none has yet been found to be commercially acceptable. Attempts have been made to prevent the segregation of the tailings into coarse and fine fractions by treatment with chemicals such as lime, but no commercially attractive process has yet emerged. The remixing of the fine settled material with coarser tailings produced in an earlier stage of the production and separation processes has also been tried, but it is generally found that the two components of the mixture quickly separate again. The capture of fine particles by the coarser particles can be improved by the use of certain chemical treatment agents, but these agents are generally expensive, and again no very encouraging results have been observed. If the fine settled material can be spread on the land, a natural cycle of freezing followed by thawing will eventually convert the material to a fine soil-like deposit. Also natural evaporation of water, and consequent drying of the settled material, will achieve a similar effect. However, enormous areas of land, and periods of tens of years, are required to complete these processes.

STATEMENT OF INVENTION

According to the present invention there is provided a method of treating a relatively dilute aqueous suspension of a waste material from a process for recovering petroleum from oil sand, wherein the suspension is further diluted with at least 75% of its own volume of water, and the solids component of the diluted suspension is allowed to sediment with the result that substantially solids-free water can be separated therefrom leaving the solids component in a more highly concentrated form.

The process from which the aqueous suspension to be treated has been obtained may be one in which an alkali such as sodium hydroxide solution has been used to treat the oil sand.

The initial solids concentration of the waste material suspension will generally be not greater than 40% by weight of dry solids, and will most commonly be less than about 35% by weight of dry solids.

The sedimentation of the solids component of the suspension may be achieved by allowing the solids component to settle under gravity, or by an additional separation step such as centrifuging the suspension.

We have discovered that, surprisingly, the solids component of the waste material suspension can be concentrated simply be diluting the suspension with at least 75% of its own volume of water, and allowing the solids component to sediment. The water used for the dilution is preferably clean natural water, rather than water which has been recovered after industrial use. For example, water from a river or natural lake is very suitable for the purpose. Without being bound to any particular theory, we believe that the waste material suspension, which results from a process of the type described above for recovering petroleum products from oil-bearing sand, generally contains a relatively high proportion of dissolved metal cations which exert a flocculating effect on the solids component of the suspension. The result is that a strong three-dimensional floc structure is formed which traps water within its structure and prevents the solids component from compacting to a solids concentration above about 30% by weight of the dry solids. Dilution of the suspension with relatively clean water causes a reduction in the concentration of dissolved metal cations, and the degree of flocculation of the solids component is greatly reduced, with the result that further compaction and concentration of the solids component becomes possible.

The solids concentration of the sedimented solids component resulting from use of the method according to the present invention will be at least 50% by weight, and is preferably in the region of 60% by weight, of dry solids. The suspension of the waste material is preferably further diluted with at least 100% and not more than about 500% of its own volume of water.

The substantially solids-free water which separates from the solids component during the sedimentation step may contain a proportion of oil which had previously been trapped in the floc structure of the waste material. The water is conveniently returned to an earlier stage of the process for recovering oil from the oil sand.

In the method according to the present invention, the suspension to be treated may be diluted with water in a pond or lagoon in which it has been stored. Substantially pure water, for example from a natural watercourse may be introduced at one side of the pond or lagoon, and effluent water, which is substantially solids-free, but which contains dissolved alkali metal compounds and some oil in suspension, may be drawn off at another side of the pond or lagoon and recirculated to the process for recovering oil from oil sand. The dilution of the suspension with substantially pure water causes the solids component of the suspension to deflocculate more completely and to settle under its own weight to form a thickened deposit of the solids component on the bottom of the pond or lagoon. When the solids component in the pond or lagoon has formed a hard deposit having a solids content of at least 50% by weight, and preferably at least 60% by weight, the flow of clean water is stopped, and the remaining effluent water is substantially completely removed. The hard deposit of the solids component remaining in the bottom of the pond or lagoon may then be covered, for example with earth or sand, and the area relandscaped. Alternatively, the hard deposit may be dug out, diluted with water and subjected to a particle size separation step in, for example, an hydraulic cyclone, a centrifuge or a gravity separating tank. If necessary a dispersing agent for the solids component may also be added. The amount of the dispersing agent used will generally be from about 0.01 by weight to about 1% by weight, based on the dry weight of the solids component. The particle size separation step is preferably such as to provide a fine fraction consisting predominantly of particles having an equivalent spherical diameter smaller than $5\mu m$, and preferably smaller than $3\mu m$. The fine fraction may be dewatered, for example by adding a chemical flocculant and filtering the suspension of the fine fraction to form a cake. This cake may then be calcined to form a metakaolin-containing material as described hereinafter.

The solids component of the waste material treated by the method according to the present invention typically comprises a mixture of about 40–60% by weight of kaolinitic clay, 15–35% by weight of fine quartz, 10–30% by weight of mica, and minor amounts of other minerals such as anatase, rutile, siderite, pyrite and haematite. The solids component, when concentrated by the method according to the present invention, may be employed in a known application for use of kaolin/quartz/mica composition. This component may be fractionated to form a coarse fraction and a fine fraction, and the fine fraction, e.g. less than $5\mu m$, and preferably less than $3\mu m$, equivalent spherical diameter, may be the one which is further used. For example a possible use for the concentrated solids component, optionally fractionated to a fine fraction, is as a raw material for manufacturing a pozzolanic material for use making a cementitious material for construction purposes. A pozzolanic material is defined as a pulverulent siliceous or aluminosiliceous material which will react with slaked lime, or calcium hydroxide, at ambient temperature and in the presence of moisture to form a cementitious compound. An example of a natural product which has pozzolanic properties is volcanic ash, but it is now more common to use pozzolanic materials which are by-products of industrial processes such as ground granulated blast furnace slag, pulverised fly ash and condensed silica fume.

Metakaolin, the product of calcining kaolinitic clay at a temperature in the range of from 550° C. to 925° C. for from a few minutes to 8 hours, is one of the best pozzolanic materials presently known. It reacts very rapidly, i.e. within 14–28 days with approximately its own weight of calcium hydroxide.

Concrete is generally not durable when exposed to aggressive conditions. Examples of commonly occurring aggressive conditions are those which obtain where there is contact with aqueous media of low pH, for example farmyard effluents, with salt solutions, as is the case with marine structures and road bridges, or with running water. One of the main reasons for low durability is the presence of crystals of calcium hydroxide in the cured concrete. Calcium hydroxide is formed as a hydration product of Portland cement according to the formula:

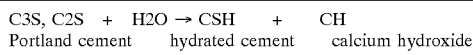

| C3S, C2S | + | H2O | → | CSH | + | CH |
|---|---|---|---|---|---|---|
| Portland cement | | | | hydrated cement | | calcium hydroxide |

Unfortunately, calcium hydroxide is soluble in water with the result that it can be leached out of concrete leaving a weakened porous structure. Also it is chemically reactive and highly alkaline. It reacts with sulphate and chloride ions and can dissolve silica and glass such as is present in glass fiber reinforced concrete. In many cases the structure is weakened, and the chemical reactions lead to swelling and cracking of the concrete.

Pozzolanic materials can improve the durability of concrete by chemically combining with some of the calcium hydroxide. Stable cementitious compounds are formed which are less chemically reactive and less soluble. Typical pozzolanic materials include ground granulated blast furnace slag, pulverised fly ash and silica fume. However, these all suffer from certain disadvantages, namely that they are generally inconsistent in quality and effectiveness, they have a relatively low pozzolanic reactivity, they react only slowly with calcium hydroxide, and they may contain deleterious impurities such as carbon, sulphur compounds and alkali metal ions. Metakaolin, on the other hand, has no deleterious side effects, reacts rapidly with calcium hydroxide, and, on a weight for weight basis, has a relatively high capacity for fixing calcium hydroxide.

In the process for recovering petroleum products from oil sand, some volatile by-product are formed for which no use has yet been found, and which are normally removed by burning. These volatile by-products could be used as fuel in a kiln for calcining the concentrated waste material from the process for recovering oil from oil sand to produce a pozzolanic material containing metakaolin.

BRIEF DESCRIPTION OF THE DRAWINGS

Embodiments of the present invention will now be described by way of example only with reference to the accompanying drawings.

FIGS. 1, 2 and 3, which are diagrammatic flow sheets for a process embodying the invention.

DETAILED DESCRIPTION OF THE PREFERRED EMBODIMENTS

Figure 3:
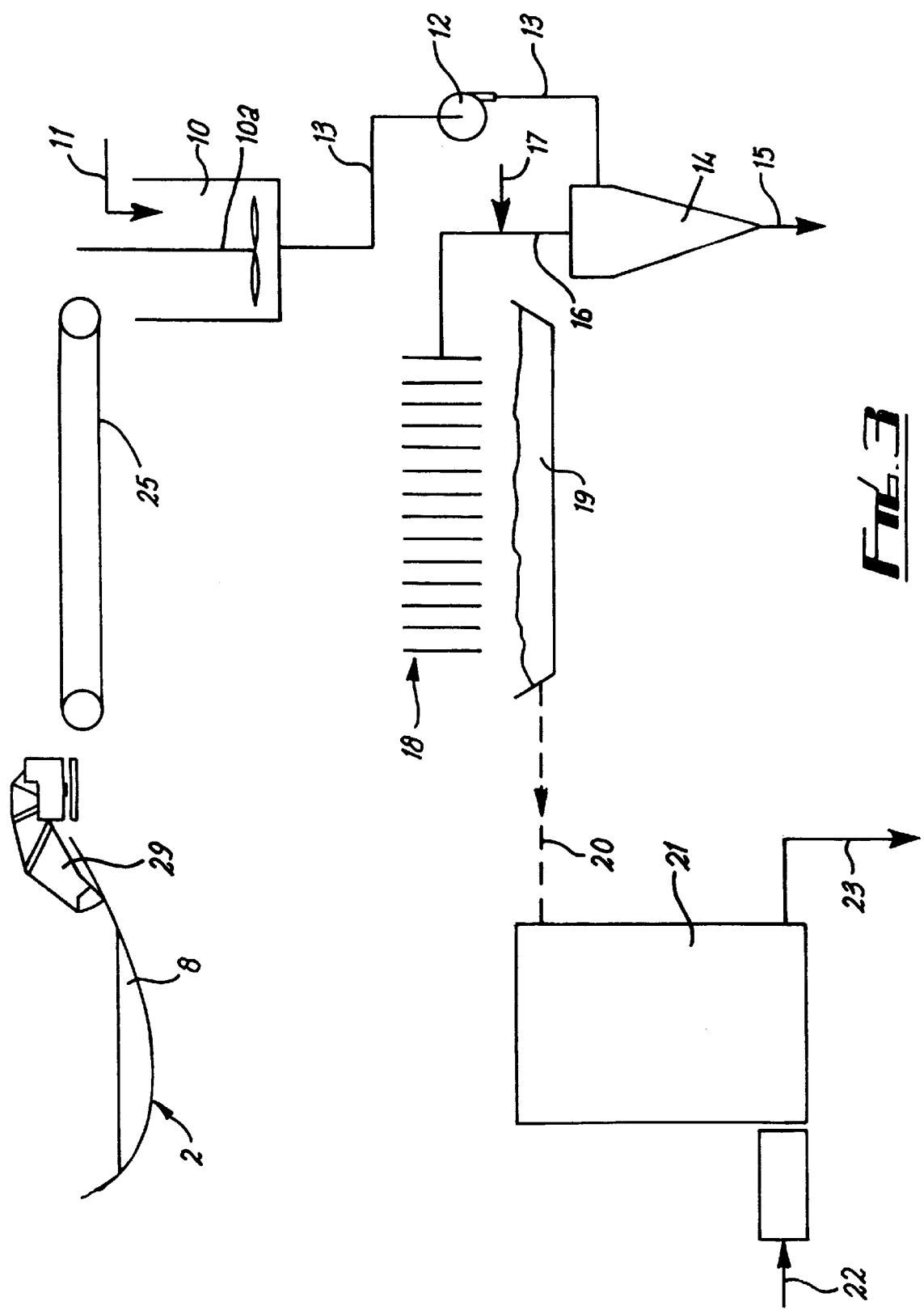

Referring first to FIG. 1, a waste material suspension from a process for recovering oil from oil sand using a dilute sodium hydroxide solution in the manner described hereinbefore flows through a conduit 1 to a first pond 2. Coarse solid particles settle out almost immediately to form a beach 3, and finer solid particles settle more slowly over a relatively long period of time to form a gel-like deposit 4, having a solids content of about 30% by weight of dry solids, and a layer of relatively solids-free water 5, which is returned to the process for recovering oil from oil sand through a conduit 6. When the pond 2 is effectively full of the gel-like deposit 4, or, in other words, when the water overflowing through the conduit 6 is no longer substantially solids-free, the waste material suspension is diverted to a second pond (not shown) which is filled in a similar manner, and, as shown in FIG. 2, fresh river water is introduced into the first pond 2 through a conduit 7. The gel-like deposit 4 is washed and diluted by the fresh water, and, as a result, becomes more completely deflocculated, and the particles repel one another so that the structure of the gel-like deposit 4 is broken up, with the result that the individual particles sink further under gravity, and a hard deposit 8 is formed on the bottom of the pond 2, while water 9, which is substantially solids free, but contains dissolved sodium compounds and suspended oil, which has been released from the gel structure as it breaks up, overflows through the conduit 6 and is returned to the process for recovering oil from oil sand for re-use in that process. When the hard deposit 8 of solid particles has thickened to a solids concentration of about 60% by weight, the flow of fresh water is stopped and the remaining effluent water is substantially completely removed through conduit 6. The deposit of solid particles may then be covered with earth or sand, and the area of the pond may be landscaped or used for agriculture.

Alternatively the deposit of solid particles may be excavated by means of a dragline excavator 29, as shown in FIG. 3, and transported by a belt 25 to a mixing vessel 10 having a mixer 10a, where the deposit is diluted with fresh water supplied through a conduit 11 to a solids concentration of about 40% by weight. The diluted suspension is pumped by means of a pump 12 through a conduit 13 to a bank of hydraulic cyclones 14 (only one shown) in which a particle size separation is effected, a suspension of a fine fraction consisting predominantly of particles having an equivalent spherical diameter smaller than $3 \mu m$ being discharged through the vortex finders of the cyclones 14, and an output of a coarse fraction 15 consisting predominantly of particles larger than this size leaving the cyclones through their spigots. The fine fraction passes through a conduit 16, into which a small quantity of a chemical flocculant for the fine particles is introduced through a conduit 17, to a filter press 18. The filter press forms a cake 19 of substantially dewatered solids, which are transferred along a path 20 to a calciner kiln 21, the temperature of which is maintained in the range of from 450° to 925° C., where the kaolinite contained in the fine solids is dehydroxylated to form metakaolin and thus produce an output of a product 23 with useful pozzolanic properties. The kiln 21 is supplied with volatile by-products from the process for recovering oil from oil sand through a conduit 22.

EXAMPLE

An example of an experiment to demonstrate the benefit of the process as illustrated in FIGS. 1 to 3 has been carried out as follows. Samples were taken respectively (A) from the suspension of waste material entering the tailings lagoon of a plant for recovering oil from oil sand on the Athabasca River in Northern Alberta, and (B) from the deposit which had formed at the bottom of the lagoon. The suspension (A) entering the lagoon was found to have a solids concentration of 8% by weight of dry solids, and the deposit (B) from the bottom of the lagoon was found to have a solids concentration of about 30% by weight.

A first sample (A1) of the unthickened suspension was allowed to stand in a container for three weeks, after which time a layer of clear water appeared at the top of the container and the deposit at the bottom of the container was found to have a solids concentration of 30% by weight of dry solids, but no further concentration could be obtained however long the sample was allowed to stand.

A second sample (A2) of the unthickened suspension was diluted with four times its volume of tap water, and the diluted suspension was allowed to stand for three weeks in a container. At the end of this time a layer of clear water had appeared at the top of the container and the deposit at the bottom of the container was found to have a solids concentration of 60% by weight of dry solids.

The deposit formed by diluting sample A2 and allowing the diluted suspension to stand was diluted with a further quantity of tap water and was subjected to particle size separation by gravitational sedimentation to give three particle size fractions consisting predominantly of, respectively:

(a) particles having an equivalent spherical diameter larger than $10 \mu m$;

(b) particles having an equivalent spherical diameter in the range of from 3 to $10 \mu m$; and (c) particles having an equivalent spherical diameter smaller than $3 \mu m$.

The percentage by weight recovery of the original deposit, on a dry weight basis, in each of the three fractions was determined. Each of the three fractions was also subjected to a mineralogical analysis by means of X-ray diffraction, and to a particle size analysis by means of a "SEDIGRAPH" particle size analyser, manufactured by Micromeritics Corporation.

The solids component of each fraction was dewatered and calcined at a temperature of 500° C. for 30 minutes. The reactivity of each calcined product with calcium hydroxide was determined by a method which is generally known in the field of concrete technology as the "Chappelle test". In this test a dilute slurry of the pozzolanic material was reacted with excess calcium hydroxide at 95° C. for 18 hours. At the end of this period, the amount of unreacted calcium hydroxide was determined by titration. The procedure is described in detail by R. Largent, Bull. Liaison Lab. Ponts et Chaussées, Vol. 93 (1978), page 63. The results are expressed as the weight of calcium hydroxide in milligrams absorbed by one gram of pozzolanic material.

The results are set forth in the following Table:

TABLE

| Fraction | +10 μm | −10 μm +3 μm | −3 μm |
|---|---|---|---|
| % of total weight | 22.1 | 25.7 | 52.2 |
| % by weight of | 39 | 58 | 72 |
|  | 12 | 11 | 20 |
|  | 45 | 22 | 5 |
|  | 1 | 1 | 0 |
|  | 3 | 8 | 3 |
|  | 42 | 95 | 99 |
|  | 20 | 70 | 99 |
|  | 11 | 23 | 91 |
|  | 8 | 10 | 76 |
|  | 6 | 8 | 68 |
|  | — | — | 54 |
| Chapelle test (mg · g$^{-1}$) | 394 | 378 | 557 |

A sample of substantially pure metakaolin would be expected to give a Chapelle test result in the range of from 750 to 800 mg.g$^{-1}$, so it can be seen that the less than 3μm fraction of the recovered waste solid material, when calcined under the conditions given above, has useful pozzolanic properties.

What is claimed is:

1. A method of treating an aqueous suspension of solid particulate material comprising waste material from a plant operating a process for recovering petroleum from oil sand, the suspension containing not more than 40% of solids on a dry weight basis which includes the steps of (a) diluting the suspension with at least 75 percent of its own volume of clean water to increase the settling rate of the particulate material and (b) leaving the suspension diluted in step (a) to settle by gravitational sedimentation so that the particulate material settles to form a concentrated solid sediment containing at least 50 percent by weight solids dilute aqueous layer and a layer of water on top of the concentrated solid sediment; and (c) returning the water of the layer of water to said plant for re-use therein.

2. A method as claimed in claim 1 and wherein the treated suspension has been obtained from a process in which an alkaline solution is used to treat the oil sand.

3. A method as claimed in claim 1 and wherein the treated suspension contains not more than 30 percent by dry weight of solids.

4. A method as claimed in claim 1 and wherein the treated suspension is diluted with from about 100 percent to about 500 percent of its own volume of water.

5. A method as claimed in claim 1 and wherein the water from which the concentrated solid sediment is separated is returned to the process for recovering petroleum from oil sand.

6. A method as claimed in claim 1 and wherein the solid sediment is transferred to a separation vessel in which it is fractionated into a coarse particle fraction and a fine particle fraction.

7. A method as claimed in claim 6 and wherein the fine particle fraction comprises essentially particles having an equivalent spherical diameter not greater than 3 μm.

8. A method as claimed in claim 6 and wherein the fractionation comprises said gravitational sedimentation.

9. A method as claimed in claim 6 and wherein the fractionation is carried out using one or more cyclones.

10. A method as claimed in claim 6 and wherein the fine particle fraction is separated and further treated by calcining for use as a by product.

11. A method as claimed in claim 1 and wherein the aqueous suspension to be treated is in a storage pond or lagoon to which fresh water is added.

12. A method as claimed in claim 1 and wherein the solid material in the treated suspension contains at least 40 percent by weight of kaolinitic clay.

13. A method as claimed in claim 1 and wherein the concentrated solid sediment is separated into a coarse particle fraction and a fine particle fraction and wherein the fine particle fraction is calcined.

14. A solid particulate material which is the product of the method claimed in claim 1.

15. A material as claimed in claim 14 and which has been calcined after recovery to form a pozzolanic material.

* * * * *